UNITED STATES PATENT OFFICE.

BERTRAND B. GRUNWALD, OF REDWOOD CITY, CALIFORNIA, ASSIGNOR TO NATIONAL MAGNESIA MANUFACTURING COMPANY, A CORPORATION OF CALIFORNIA.

MATERIAL FOR MAKING MONOLITHIC STRUCTURES.

1,318,075. Specification of Letters Patent. Patented Oct. 7, 1919.

No Drawing. Application filed June 18, 1917. Serial No. 175,397.

*To all whom it may concern:*

Be it known that I, BERTRAND B. GRUNWALD, a subject of the Emperor of Austria, and a resident of Redwood City, San Mateo county, State of California, have invented a new and useful Material for Making Monolithic Structures, of which the following is a specification.

The invention relates to a cement material for making monolithic or integral structures.

An object of the invention is to provide a quick settling material for making monolithic structures. The material is particularly adapted for use in making foundations, walls, floors or other structures or devices usually made of Portland cement, in which a very quick setting of the material is desired, in order that the structure may be almost immediately used. Portland cement water mixtures reach their total strength very slowly and it often requires several weeks before the structure has set sufficiently to warrant placing a load on it.

The material of my invention may be so mixed that the structure develops its full strength in several hours or less. The material consists of a water mixture of magnesia cement and "magnesium sand." The magnesia cement comprises a mixture of magnesium chlorid and magnesium oxid or calcined magnesite. In preparing the cement the chlorid is dissolved in water and the solution mixed with the magnesium oxid to form a paste. The "magnesium sand" is the residue of the manufacture of magnesium carbonate from magnesite and consists of dead burned magnesite and crude magnesite in very finely divided form. The "magnesium sand" may be mixed with the oxid before the solution is added or may be added to the wet mixture. The amount of water used is sufficient to form a paste with the finely divided "magnesium sand" and oxid. The addition of the sand greatly increases the strength of the structure and improves its water resistance and heat resistance properties. This mixture should be placed immediately after mixing and attains its full strength in a few hours. I have used as high as 50% of "magnesium sand" in the cement mixture with very favorable results, although the amount of "magnesium sand" used will vary with circumstances.

I have found that by heating the various ingredients of the mixture prior to or at the time of mixing, and pouring the mixture while hot, that the time required for setting is very greatly reduced. The time of setting may be further accelerated by adding quicklime, calcium chlorid or other calcium salt to the mixture, and this salt will accelerate the setting, whether the material is heated or not. I have added as much as 10% of calcium chlorid to the mixture with resultant very quick setting.

I claim:

A material for making monolithic structures consisting of a wet mixture of magnesium oxid, magnesium chlorid and a mixture of dead burned and crude finely divided magnesite.

In testimony whereof, I have hereunto set my hand at Redwood City, California, this 26th day of May, 1917.

BERTRAND B. GRUNWALD.

In presence of—
   JAS. T. O'KEEFE,
   B. BACON.